J. D. SYKES.
PIPE COUPLING.
APPLICATION FILED JUNE 24, 1912.
1,129,615.
Patented Feb. 23, 1915.
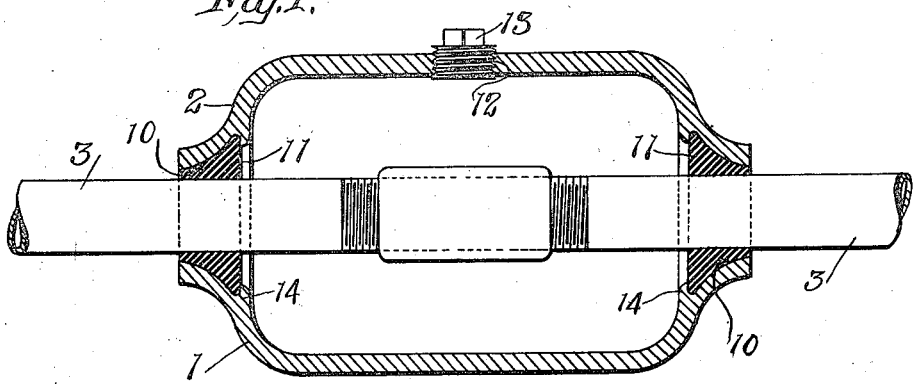
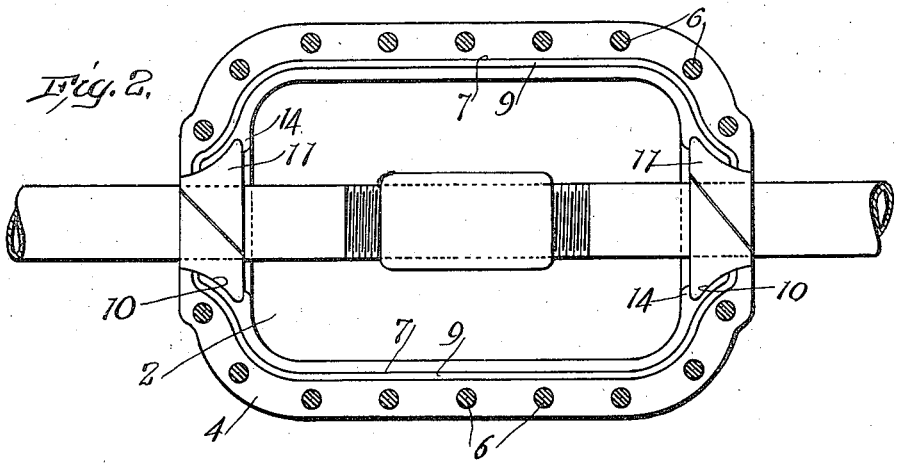
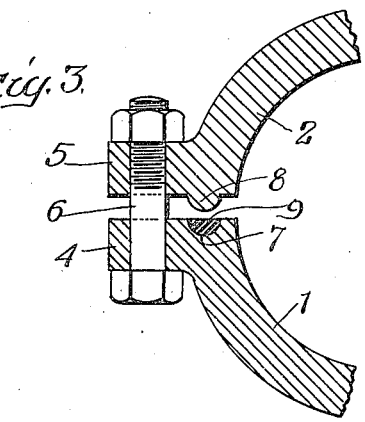
Inventor
John D. Sykes,
Witnesses
By
Attorneys

UNITED STATES PATENT OFFICE.

JOHN D. SYKES, OF COLUMBUS, OHIO.

PIPE-COUPLING.

1,129,615. Specification of Letters Patent. Patented Feb. 23, 1915.

Application filed June 24, 1912. Serial No. 705,671.

*To all whom it may concern:*

Be it known that I, JOHN D. SYKES, a citizen of the United States, residing at Columbus, in the county of Franklin and State of Ohio, have invented certain new and useful Improvements in Pipe-Couplings, of which the following is a specification, reference being had therein to the accompanying drawing.

This invention relates to pipe couplings for emergency use and more particularly to a coupling comprising a two part casing, such as a split sleeve, which is mounted on the pipes to inclose a leaking joint and prevent the escape of the fluid.

The object of the invention is to provide a casing having means for quickly and easily packing the end openings to prevent the escape of the fluid through the same, which means is of such a character that the pressure within the casing will force the packing firmly on its seat but will not be able to blow the same out.

Further, it is an object of the invention to provide means for retaining the packing in position while the two part casing is being assembled about the leaking joint.

In the accompanying drawings, Figure 1 is a longitudinal section taken vertically through a coupling embodying my invention; Fig. 2 is a top plan view of the coupling with the upper section removed; and Fig. 3 is a fragmentary transverse section taken vertically through one side of the casing.

In these drawings I have illustrated one embodiment of the invention and have shown the casing as comprising a split sleeve consisting of a lower section 1 and an upper section 2, the adjacent end portions of the two sections having openings therein to receive the adjacent portions of the pipes 3, on the opposite sides of the leak. The upper and lower sections of the casing are provided with outwardly extending parallel flanges 4 and 5 having bolt holes to receive connecting bolts 6 by means of which the two parts of the casing are secured together. The longitudinal edges may be packed in any suitable manner. As here shown the lower section has a groove 7 and the upper section a tongue 8 adapted to enter the groove and compress therein a packing 9. The casing is provided at each end with a packing seat 10 extending about the adjacent opening and preferably the end walls of the casing are flared or tapered to form a tapered seat. The packing is preferably in the form of a ring, wedge shaped in cross section, as indicated at 11. This ring fits snugly against the tapered packing seat and has its wide inner surface exposed to the pressure of the fluid within the casing. This pressure forces the packing tight against its seat and the greater the pressure the tighter will be the joint between the end of the casing and the pipe extending through the same. The wedge shaped construction of the packing ring eliminates all danger of its being blown out entirely by high pressures.

These emergency couplings are employed to close leaks in gas mains, or other fluid conducting pipe. Usually, these leaks occur at the joint between two pipes where the packing in the coupling has been blown out or the joint broken in some manner. The pressure in the pipes is usually very high, it often being as much as two hundred pounds to the inch. As a result the placing of the emergency coupling about the leak is no simple matter. To facilitate its operation I preferably provide one section of the casing, in the present instance, the upper section, with a relief port 12 having a closure in the form of a screw-threaded plug 13. This plug is removed while the casing is being assembled about the leak and after this operation has been completed the plug is inserted and the emergency coupling thus completed. To facilitate this assembling operation I prefer to provide some means for retaining the end packing rings 11 in position and, to this end, I provide one or both of the sections of the casing with inwardly extending projections, such as the annular ribs 14, which extend about the respective pipe receiving openings and are shaped to engage the inner edges of the respective packing rings and hold the same against displacement while the casing is being assembled. While I prefer to provide the projections 14 on both sections of the casing this is not absolutely essential as the projections on the lower section will hold the packing ring in fixed relation to this section while the upper section is being placed thereon.

The packing rings 11 may be of any suitable material and their exact shape is immaterial so long as the inner and outer walls converge outwardly to a sufficient extent to give the desired results. These rings are preferably split diagonally, as shown in Fig. 2, to enable the same to be placed about the pipes.

It will thus be observed that each seat 10 is frusto-conical in shape, the smaller end of the seat being disposed at the outer end of the opening. It will also be observed that the gasket 11 fits the space between the seats and the pipes, and each gasket is formed with a large inner face which is arranged at right angles to the axis of the opening and constitutes an abutment. As a result of this construction when a leak occurs within the casing, the pressure within the casing bears against the inner faces, or abutments, of the gaskets and causes said gaskets to be expanded against the respective seats and pipes, thereby effecting a watertight joint.

While I have shown and described one embodiment of the invention it will be understood that this has been chosen for the purpose of illustration only and that I do not desire to be limited to the details of construction shown and described, for obvious modifications will occur to a person skilled in the art.

Having thus fully described my invention, what I claim as new and desire to secure by Letters Patent, is:—

1. A device of the character described comprising a casing divided longitudinally to enable it to be placed about a pipe to inclose a leak therein, while the fluid in said pipe is under pressure, said casing having pipe-receiving openings at its opposite ends and being provided with packing seats extending about the respective openings, compressible packing rings engaging the respective seats, said packing rings being split transversely to enable them to be placed about said pipe and having their inner end portions exposed to the pressure within said casing, whereby said pressure will force said packing rings into firm engagement with their seats, and means carried by said casing to retain said packing rings in their proper positions while said casing is being assembled.

2. A device of the character described comprising a casing divided longitudinally to enable it to be placed about a pipe to inclose a leak therein, while the fluid in said pipe is under pressure, said casing having pipe-receiving openings at its opposite ends and being provided with outwardly tapered packing seats extending about the respective openings, compressible packing rings engaging the respective seats, said packing rings being split transversely to enable them to be placed about said pipe and being wedge-shape in cross section and having their wider end portions exposed to the pressure within said casing, whereby said pressure will force the packing rings into firm engagement with their respective seats, and means carried by said casing to retain said packing rings in their proper positions while said casing is being assembled.

3. A device of the character described comprising a casing divided longitudinally to enable it to be placed about a pipe to inclose a leak therein, while the fluid in said pipe is under pressure, said casing having pipe-receiving openings at its opposite ends and being provided with outwardly tapered packing seats extending about the respective openings, compressible packing rings engaging the respective seats, said packing rings being split transversely to enable them to be placed about said pipe and being wedge-shaped in cross section and having their wider end portions exposed to the pressure within said casing, whereby said pressure will force the packing rings into firm engagement with their respective seats, and projections extending inwardly from said casing near the respective packing seats and arranged to engage the inner edges of the respective packing rings and retain the same in position while the casing is being assembled.

In testimony whereof, I affix my signature in presence of two witnesses.

JOHN D. SYKES.

Witnesses:
    J. M. GARARD,
    J. F. CURRY.